United States Patent Office 3,000,946
Patented Sept. 19, 1961

3,000,946
β-AMINO-α-BROMO-PROPIOPHENONES
George de Stevens, New Providence, N.J., assignor to Ciba Pharmaceutical Products, Inc., Summit, N.J., a corporation of New Jersey
No Drawing. Filed Mar. 18, 1958, Ser. No. 722,152
6 Claims. (Cl. 260—570.5)

The present invention concerns α-halogeno-ketones. More particularly, it relates to α-halogeno-ketones of the formula:

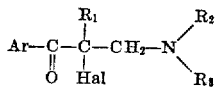

in which Ar stands for an aryl radical, Hal for a chlorine or a bromine atom and $R_1$ for hydrogen or a lower hydrocarbon radical, and in which each of the radicals $R_2$ and $R_3$ represent lower alkyl radicals, the acid addition salts and quaternary ammonium compounds thereof, as well as process for the preparation of such compounds.

The aryl radical is particularly a monocyclic aryl radical and may be a phenyl radical, which is unsubstituted or may contain one or more substituents. Such substituents are particularly lower alkyl radicals, e.g. methyl, ethyl, propyl, isopropyl or tertiary butyl; hydroxyl; esterified hydroxyl, such as lower alkoxy, e.g. methoxy, ethoxy, propyloxy, isopropyloxy, butyloxy; lower alkylene-dioxy, e.g. methylenedioxy; or tertiary amino-lower alkoxy, e.g. 2-dimethylaminoethoxy or 2-diethylaminoethoxy; esterified hydroxyl, such as lower alkanoyloxy, e.g. acetoxy; amino; secondary amino, such as lower alkylamino, e.g. methylamino or ethylamino; or tertiary amino, such as di-lower alkyl-amino, e.g. dimethyl or diethylamino; or halogen atoms, e.g. chlorine or bromine.

The radical $R_1$ stands primarily for hydrogen. It also represents a lower hydrocarbon radical, particularly a lower alkyl radical, e.g. methyl, ethyl, propyl or isopropyl; further hydrocarbon radicals may be a cycloalkyl radical having 5 or 6 carbon atoms, e.g. cyclopentyl or cyclohexyl; an aryl radical, such as a monocyclic aryl radical, e.g. unsubstituted phenyl or phenyl substituted with one of the above listed substituents; or an aralkyl radical, e.g. unsubstituted benzyl or benzyl substituted with one of the above listed substituents.

The lower alkyl radicals $R_2$ and $R_3$ are represented by methyl, ethyl, propyl, isopropyl or butyl, etc.

Salts of the new compounds of this invention are particularly therapeutically useful acid addition salts, for example those with inorganic acids, such as hydrohalic acids, e.g. hydrochloric or hydrobromic acid; thiocyanic acid; or sulfuric or phosphoric acid; or those with organic acids, such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicyclic, 2-phenoxybenzoic, 2-acetoxy-benzoic, methane sulfonic, ethane sulfonic, hydroxyethane sulfonic, benzene sulfonic, p-toluene sulfonic, naphthalene sulfonic or sulfanilic acid or methionine, tryptophane, lysine or arginine.

Quaternary ammonium derivatives of the compounds of this invention are, for example, those with reactive esters formed by hydroxylated hydrocarbons and strong inorganic or organic acids. Such esters are particularly lower alkyl halides, e.g. methyl chloride, methyl bromide, methyl iodide, ethyl chloride, ethyl bromide, ethyl iodide, propyl chloride or isopropyl bromide; di-lower alkyl sulfate, e.g. dimethyl sulfate or diethyl sulfate; or lower alkyl aryl sulfonates, e.g. methyl p-toluene sulfonate. Other quaternary ammonium derivatives are the quaternary ammonium hydroxides and the salts thereof with inorganic or organic acids, for example, with those used for the preparation of the acid addition salts.

Due to the presence of an asymmetric carbon atom the compounds of this invention, their salts or quaternary ammonium compounds may be obtained as the optically inactive racemates, the d,l-form, or these racemates may be resolved into the antipodes, the optically active d- and l-forms.

The compounds of this invention have adrenergic blocking activity; in particular, they reverse the effect of epinephrine, block norepinephrine and reverse the effects of ganglionic stimulants, such as dimethyl phenyl piperazinium iodide (DMPP). The new compounds may therefore be used as adrenergic blocking agents to relieve peripheral vascular disorders, such as Raynaud's disease, end-arthritic, and thrombotic, traumatic and arteriosclerotic ulcers of the extremities. Especially valuable with respect to their adrenolytic activity are the α-halogeno-ketones of the formula:

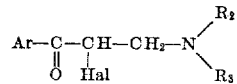

in which Ar stands for a phenyl radical substituted by hydroxyl and/or esterified hydroxyl, such as lower alkoxy, e.g. methoxy, ethoxy, isopropyloxy or n-butyloxy; or lower alkylene dioxy, e.g. methylenedioxy, Hal represents chlorine or bromine and each of the radicals $R_2$ and $R_3$ stands for lower alkyl, and the addition salts with hydrohalic acids, e,g. hydrochloric or hydrobromic acid.

The new compounds of this invention may be used as medicaments in the form of pharmaceutical preparation, which contain the new compounds in admixture with a pharmaceutical organic or inorganic, solid or liquid carrier suitable for enteral, e.g. oral, or parenteral, e.g. intravenous, administration. For making up the preparations there may be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be, in solid form, for example, as tablets, capsules or dragees or in liquid form, for example, as solutions, e.g. isotonic solutions, or suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

The new α-halogeno-ketones of this invention, the salts and quaternary ammonium derivatives thereof may be prepared by halogenating a compound of the formula:

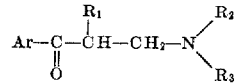

in which Ar, $R_1$, $R_2$ and $R_3$ have the above-identified meaning, or salts thereof, with bromine or chlorine, and, if desired, resolving a resulting racemate into its optically active antipodes, and/or, if desired, converting a resulting salt into the free base, and/or, if desired, converting a free base into a salt or a quaternary ammonium derivative thereof.

The halogenation process is preferably carried out by treating a solution of the starting material with molecular chlorine or bromine, if desired in a solution. Bromination may advantageously be performed by treating an acetic acid, e.g. glacial acetic acid, solution of the starting material with bromine. The acetic acid may contain, if desired, a certain percentage (from about 5 to about 50 percent, preferably about 20 percent) of hydrogen bromide. The starting material may be chlorinated by treatment with a solution of chlorine in a chlorinated hydrocarbon, e.g. methylene chloride, chloroform or ethylene chloride. The yields of the chlorination are smaller than those obtained in the bromination; better yields may be obtained by using chlorine in a closed vessel under pressure.

The starting materials used in the above reaction are known or may be prepared according to methods used for the preparation of analogous compounds, for example, by treating a ketone of the formula:

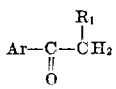

in which Ar and $R_1$ have the above-given meaning, with a secondary amine of the formula:

in which $R_2$ and $R_3$ have the above-given meaning, or a salt thereof, in the presence of formaldehyde or a low molecular weight polymer thereof, e.g. paraformaldehyde, according to the Mannich procedure. (Organic Reactions, vol. 1, p. 303, Wiley, New York 1942.)

The compounds of this invention, as well as the salts and quaternary ammonium compounds thereof may also be prepared by treating a ketone of the formula:

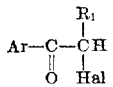

in which Ar, $R_1$ and Hal have the above-given meaning, with a secondary amine of the formula:

in which $R_2$ and $R_3$ have the above-given meaning, or a salt thereof, in the presence of formaldehyde or a lower molecular weight polymer thereof, e.g. paraformaldehyde, according to the conditions of the Mannich procedure. A salt of the secondary amine is particularly an addition salt with a hydrohalic acid, e.g. hydrochloric or hydrobromic acid; or with sulfuric acid. The reaction is carried out in solution, for example, in a lower alkanol, e.g. methanol, ethanol or propanol. If desired, a small amount of a salt-forming mineral acid, such as an aqueous hydrohalic acid, e.g. hydrochloric acid, or aqueous sulfuric acid may be added. The reaction may be carried out at room temperature, or preferably at an elevated temperature, for example, at the boiling temperature of the solvent, and, if desired, in the presence of an inert gas, e.g. nitrogen.

The starting materials used in the above reaction are known or may be prepared by methods analogous to those used for the preparation of known compounds. For example, a halogeno ketone of the formula:

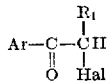

in which Ar, R and Hal have the above-given meaning, may be prepared by treating the unhalogenated ketone with chlorine or bromine according to the previously given procedure.

Depending on the conditions used, the new compounds of this invention are obtained in the form of the free bases or as the salts thereof. A salt may be converted into the free base in the customary way, for example, by reaction with an aqueous alkaline reagent, such as an alkali metal hydroxide, e.g. sodium hydroxide or potassium hydroxide, an alkali metal carbonate, e.g. sodium carbonate or potassium hydrogen carbonate; or ammonia. A free base may be transformed into its therapeutically useful acid addition salts by reaction with an appropriate inorganic or organic acid, such as one of those outlined hereinabove, for example, in a lower alcohol, e.g. methanol, ethanol, propanol or isopropanol, solution or in an ether, e.g. diethylether, solution or a mixture of such solvents.

The compounds of this invention may be converted into quaternary ammonium compounds by reacting the tertiary bases with an ester formed by a hydroxylated lower hydrocarbon compound and a strong inorganic or organic acid. Hydroxylated lower hydrocarbon compounds contain from 1 to 7 carbon atoms and the esters thereof are more especially those with inorganic acids, such as mineral acids, e.g. hydrochloric, hydrobromic, hydriodic or sulfuric acid; or with organic acids, such as aryl sulfonic acids, e.g. p-toluene sulfonic acid. Such esters are specifically lower alkyl halides, e.g. methyl chloride, methyl bromide, methyl iodide, ethyl chloride, ethyl bromide, ethyl iodide, propyl chloride or isopropyl bromide; di-lower alkyl sulfates, e.g. dimethyl sulfate or diethyl sulfate; or lower alkyl aryl sulfonates, e.g. methyl p-toluene sulfonate. The quaternizing reactions, such as outlined above, are performed in the presence or absence of a solvent, at room temperature or under cooling, atmospheric pressure or in a closed vessel under pressure. Suitable solvents are more especially lower alkanols, e.g. methanol, ethanol, propanol, isopropanol, butanol or pentanol; or organic acid amides, e.g. formamide or dimethylformamide.

Quaternary ammonium compounds obtained may be converted into the corresponding quaternary ammonium hydroxides, for example, by reaction of the resulting quaternary ammonium halides with silver oxide, by reaction of the quaternary ammonium sulfates with barium hydroxide, by treating the quaternary ammonium salts with an anion exchanger, or by electrodialysis. From the resulting base there may be formed therapeutically suitable quaternary ammonium salts by reaction with acids, for example, with those mentioned hereinbefore for the preparation of acid addition salts, or with mono-lower alkyl sulfates, such as methyl sulfate or ethyl sulfate. A resulting quaternary ammonium salt may be directly converted into another quaternary ammonium salt without conversion into the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol.

Ordinarily the α-halogeno-ketones of this invention are obtained in the form of their racemates, i.e. the optically inactive d,l-forms, which may be resolved into the antipodes, i.e. the optically active d- and l-forms according to procedures known for the resolution of racemates. For example, a solution of the racemic free base of an α-halogeno-ketone of this invention may be treated with an optically active form of an acid containing one or more asymmetric carbon atoms, or a solution thereof, whereupon a salt of one of the antipodes of the base with the optically active form of the acid may be isolated, in which salt, both the anion and the cation, have the same direction of optical rotation, i.e. the l-form of an acid forms a salt with the l-form of the base, and vice-versa. Particularly useful as optically active forms of acids having asymmetric carbon atoms are D- and L-tartaric acid; furthermore, the antipodes of malic, mandelic, camphor sulfonic or quinic acid may be used. The reaction is preferably carried out in solution, especially in a lower alkanol, e.g. methanol or ethanol, and the resulting salt is isolated and purified by crystallization, e.g. fractionated crystallization; recrystallization or adsorption. A resulting salt of an optically active base with an optically active acid may be converted into the optically active base according to the above-given procedure for the conversion of a salt into the base; said optically active base may then form salts with any of the above-mentioned acids used for the preparation of acid addition salts or form quaternary ammonium compounds according to the above-described procedure.

The invention also comprises any modification of the general process wherein a compound obtainable as an intermediate at any stage of the process is used as starting material and the remaining step(s) of the process is (are) carried out, as well as any new intermediates.

The following examples illustrate the invention; they are not to be construed as being limitations thereon. Temperatures are given in degrees centigrade.

*Example 1*

A solution of 23.0 g. of 1-(4-ethoxyphenyl)-3-dimethylamino-propane-1-one hydrobromide in 140 ml. of glacial acetic acid containing 20 percent hydrogen bromide is treated with 12.2 g. of bromine at a temperature of 5°. After stirring for a half hour, ether is added and the crystalline precipitate collected. The 1-(4-ethoxyphenyl)-2-bromo-3-dimethylamino-propane-1-one hydrobromide, obtained in 96 percent yield, is recrystallized from ethanol; M.P. 183–184°.

*Example 2*

By treating 2.5 g. of 1-(4-hydroxyphenyl)-3-dimethylamino-propane-1-one hydrobromide in 20 ml. of glacial acetic acid containing 20 percent of hydrogen bromide with an equivalent amount of bromine according to the procedure of Example 1 the 1-(4-hydroxyphenyl)-2-bromo-3-dimethylamino-propane-1-one hydrobromide is obtained, which is recrystallized from ethanol, M.P. 166°.

*Example 3*

The 1-(2,4-dihydroxyphenyl)-2-bromo-3-dimethylamino-propane-1-one hydrobromide, M.P. 180–183° after recrystallization from ethanol, is prepared by treating a solution of 10 g. of 1-(2,4-dihydroxyphenyl)-3-dimethylamino-propane-1-one in glacial acetic acid containing 20 percent hydrogen bromide with an equivalent amount of bromine according to the procedure in Example 1.

*Example 4*

A solution of 9.3 g. of 1-(3,4-dihydroxyphenyl)-2-chloro-ethane-1-one, 4.05 g. of dimethylamine hydrochloride, 2.4 g. of paraformaldehyde and 0.25 ml. of concentrated hydrochloric acid in ethanol is refluxed for three hours. An additional amount of 1 g. of paraformaldehyde is added and refluxing is continued for eight hours. The reaction mixture is poured into warm acetone, ether is added to turbidity and the mixture stirred. The crystalline 1-(3,4-dihydroxyphenyl)-2-chloro-3-dimethylamino-propane-1-one hydrochloride is collected and recrystallized from ethanol, M.P. 168–170°.

By using diethylamine hydrochloride instead of the dimethylamine hydrochloride in the above reaction, the 1-(3,4-dihydroxyphenyl)-2-chloro - 3 - diethylamino-propane-1-one hydrochloride is formed.

*Example 5*

A mixture of 4.8 g. of 1-(4-ethoxyphenyl)-2-methyl-3-dimethylamino-propane-1-one hydrobromide and 2.43 g. of bromine in 40 ml. of glacial acetic acid containing 20 percent hydrogen bromide is treated as described in Example 1; the 1-(4-ethoxyphenyl)-2-bromo-2-methyl-3-dimethylamino-propane-1-one hydrobromide melts at 146–147° after recrystallization from ethanol; yield: 80 percent.

*Example 6*

The reaction of 10 g. of 1-(4-n-butyloxy-phenyl)-3-dimethylamino-propane-1-one with 4.85 g. of bromine in 70 ml. of glacial acetic acid containing 20 percent of hydrogen bromide according to Example 1 yields the 1-(4-n-butyloxy-phenyl)-2-bromo-3-dimethylamino-propane-1-one hydrobromide, M.P. 162–163° after recrystallization from ethanol; yield: 92 percent.

*Example 7*

The 1-(4-isopropyloxy-phenyl)-2-bromo - 3 - dimethylamino-propane-1-one, M.P. 174–175° after recrystallization from ethanol, is obtained by reacting 6.5 g. of 1-(4-isopropyloxyphenyl)-3-dimethylamino-propane-1-one hydrobromide with an equimolar amount of bromine according to the procedure of Example 1; yield: 75 percent.

*Example 8*

By reacting 10 g. of 1-(4-methoxy-phenyl)-3-dimethylamino-propane-1-one hydrobromide with an equimolar amount of bromine according to the procedure of Example 1, the 1-(4-methoxyphenyl)-2-bromo-3-dimethylamino-propane-1-one hydrobromide is obtained, M.P. 172–175°; yield: 80 percent.

By treating the hydrobromide salt with a dilute aqueous solution of ammonia, extracting with ether, drying and concentrating the ether solution, and adding ethanolic hydrogen chloride, the hydrochloride of 1-(4-methoxyphenyl)-2-bromo-3 - dimethylamino - propane-1-one may be obtained. Instead of using ethanolic hydrogen chloride, an isopropanol solution of D,L-tartaric acid may be used and the D,L-tartrate is isolated.

Treatment of an ethanol solution of the free base with an excess of methyl iodide yields the 1-(4-methoxyphenyl)-2-bromo-3-dimethylamino-propane-1-one methiodide.

What is claimed is:

1. A member of the group consisting of α-bromoketones of the formula:

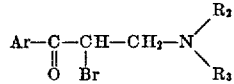

in which Ar stands for a phenyl radical substituted in the 4-position by lower alkoxy and each of the radicals R₂ and R₃ stand for lower alkyl, addition salts thereof with therapeutically acceptable acids.

2. 1-(4-ethoxyphenyl)-2-bromo -3- dimethylamino-propane-1-one.

3. 1-(4-n-butyloxy-phenyl)-2-bromo-3-dimethylamino-propane-1-one.

4. 1-(4-isopropyloxyphenyl)-2-bromo-3 - dimethylamino propane-1-one.

5. 1-(4-methoxyphenyl)-2-bromo-3-dimethylamino-propane-1-one.

6. 1-(4-ethoxyphenyl)-2-bromo-2-methyl - 3 - dimethylamino-propane-1-one.

References Cited in the file of this patent

UNITED STATES PATENTS

| | | |
|---|---|---|
| 2,155,194 | Kamlet | Apr. 18, 1939 |
| 2,778,853 | Schultz | Jan. 22, 1957 |
| 2,904,591 | Hanell et al. | Sept. 15, 1959 |

FOREIGN PATENTS

| | | |
|---|---|---|
| 80,152 | Denmark | Nov. 7, 1955 |

OTHER REFERENCES

Gabriel: Justus Liebig's Annalen, vol. 409: page 312 (1915).

Bergel et al.: Journal of the Chemical Society, (1944), page 263.

Schultz et al.: Journal of the American Chemical Society, vol. 75: page 1128 (1953).

UNITED STATES PATENT OFFICE
CERTIFICATE OF CORRECTION

Patent No. 3,000,946            September 19, 1961

George de Stevens

It is hereby certified that error appears in the above numbered patent requiring correction and that the said Letters Patent should read as corrected below.

Column 1, lines 59 and 60, for "salicyclic, 4-aminosalicyclic" read -- salicylic, 4-aminosalicylic --; column 2, line 29, for "esterified" read -- etherified --.

Signed and sealed this 26th day of June 1962.

(SEAL)
Attest:

ERNEST W. SWIDER
Attesting Officer

DAVID L. LADD
Commissioner of Patents